United States Patent [19]

Cornwell et al.

[11] 4,042,745
[45] Aug. 16, 1977

[54] CEMENTITIOUS SOUND ABSORBING PANELS AND SOUND ABSORBING SPRAYED WALL STRUCTURES

[76] Inventors: Charles E. Cornwell, 7104 Marlan Drive; Mark Plunguian, 6912 Columbia Drive, both of Alexandria, Va. 22307

[21] Appl. No.: 705,335

[22] Filed: July 14, 1976

[51] Int. Cl.² ............................................. B32B 3/26
[52] U.S. Cl. ............................ 428/310; 181/33 G; 428/141; 428/321; 156/257; 156/264
[58] Field of Search .................... 181/33 G, 33 GA; 428/137, 138, 141, 150, 310, 313, 314, 321, 131, 132; 264/42

[56] References Cited

U.S. PATENT DOCUMENTS

| | | | |
|---|---|---|---|
| 1,770,767 | 7/1930 | Collings et al. | 181/33 G |
| 1,804,753 | 5/1931 | Douglas | 181/33 G |
| 1,839,887 | 6/1932 | New | 181/33 G |
| 1,900,522 | 3/1933 | Sabine | 181/33 G |
| 1,901,057 | 3/1933 | Roos | 181/33 G |
| 1,906,123 | 4/1933 | Eaton | 181/33 G |
| 1,914,592 | 6/1933 | Birchy et al. | 181/33 G |
| 2,008,718 | 7/1935 | Jenkins | 181/33 G |
| 2,096,233 | 10/1937 | Ericson | 181/33 G |
| 2,694,025 | 11/1954 | Slayter et al. | 181/33 G |
| 3,595,947 | 7/1971 | Willinga | 428/150 |
| 3,819,388 | 6/1974 | Cornwall | 106/90 |
| 3,995,086 | 11/1976 | Plunguian et al. | 428/310 |
| 4,002,788 | 1/1977 | Lott | 428/313 |

*Primary Examiner*—William J. Van Balen

[57] ABSTRACT

Sound absorbing panels and sprayed wall structures are produced from inorganic cementitious compositions to which preformed foams are admixed to yield low density fireproof products having an interconnected cellular structure and a perforated surface skin for the conversion of a large proportion of incident sound into heat and thus reduce the reflected energy to a small volume.

8 Claims, No Drawings

CEMENTITIOUS SOUND ABSORBING PANELS AND SOUND ABSORBING SPRAYED WALL STRUCTURES

BACKGROUND OF THE INVENTION

A primary objective of the invention is to provide fireproof sound absorbing panels and sprayable wall covering, for ceiling tiles, office partitions, residential buildings, and sound absorption barriers for industrial structures and for the attenuation of highway noise.

A secondary objective is to provide low cost insulating and decorative panels and wall covering for offices and homes.

Another objective of the invention is to provide a novel method for the production of mineral hydraulic cementitious sound absorbing panels and wall structures.

SUMMARY OF THE INVENTION

For sound energy to be absorbed and converted into heat it is necessary to provide a barrier with an interconnected cellular structure. By our method of producing foamed cementitious structures, the greater the content of air cells, the lower the density of the cementitious product, and the greater the percentage of interconnected cells. A useful range for the production of a sound absorbing barrier is at a density of about 20 to 40 pounds per cubic foot. At these low densities, the structures are rather weak. However, low density foamed mortars dry with a tough, impervious skin. We have now found that when this skin is perforated, as by ⅛ inch diameter holes at ½ inch centers to provide about 15% of open space, the dual purpose is attained of providing a medius for both excellent sound absorption and partial sound reflection, as well as a useful structural material. Another means of achieving the same objectives is to cast the low density, interconnected cellular structures in large blocks, slice them to the required thicknesses and bond to the surfaces thin perforated aluminum or m.p. steel plates. Other decorative and durable materials can be bonded to the low density panels, such as perforated plastic sheeting, wood veneers, or pressed hardboard.

The low density cementitious products may be formed from any of the hydraulic cements, such as portland, calcium aluminate, or gypsum cements, by forming a mortar preferably with low density aggregate, such as vermiculite or perlite, and then admixing a preformed stable foam, such as those described in our U.S. Pat. No. 3,819,388 and in the copending U.S. Pat. applications No. 585,496, filed 06/10/75 and No. 610,990, filed 09/08/75 by the present inventors.

For casting the light weight panels, the mortar may be mixed in a mortar mixer and the pregenerated foam added to this mixer in a proportion to give the desired low density. For spraying of light weight foam-containing compositions, it is preferable to introduce the preformed foam at the nozzle, since pumping at high pressure through a long hose would tend to collapse a significant proportion of the air bubbles.

After setting the cast or sprayed cementitious composition for about a day, before it is fully cured, the surface is perforated with a device such as a large roller having the requisite spikes. Then after further curing for about a week, any dust is flushed out of the perforated structure by means of a high pressure water jet.

Slicing of larger blocks into predetermined thicknesses may also be carried out after about a day of curing. The sliced block is left in place until it is fully cured. The panels are then separated and the perforated surfacing material bonded to these panels.

The cementitious lightweight materials after curing are fireproof and do not generate any toxic fumes or smoke when subjected to a temperature of 2000° F. Room dividers composed of such panels would keep most small fires from spreading to other rooms. Ceiling tiles of such panels would act as a protective fire guard to the floor above.

A preferred method of determining the effectiveness of sound absorption, or acoustical properties of materials, is by the ASTM method C 423–66. There are only a few laboratories in the country which are capable of carrying out the required standard tests. One of these is the Cedar Knolls Acoustical Laboratories of New Jersey. The results of such tests for our acoustical panels, prepared as described in Example 1, by the Cedar Knolls Laboratories, were as follows:

Sound frequency in Hz (cycles per second)
125, 250, 500, 1000, 200, 4000
Coefficient in Sabin/square foot
0.21, 0.20, 0.37, 0.76, 0.96, 0.68
Noise reduction coefficient (NRC) = 0.55.

The significance of these results becomes clear when compared with the minimum specifications of the Washington, D.C. Metro Transit Authority for sprayed-on acoustical material, namely:

| Frequency (Hz) | 250 | 500 | 1000 |
|---|---|---|---|
| Coefficient (Sabin/ft$^2$) | 0.20 | 0.30 | 0.40 |

DETAILED DESCRIPTION OF THE INVENTION

The ranges of components used in the preparing of the acoustical structures are in parts by weight:

| Cement | 100 parts |
|---|---|
| Water | 55–120 parts |
| Pozzolonic fly ash | 0–50 parts |
| Vermiculite or perlite | 5–30 parts |
| Preformed foam | 5–30 parts |
| Chopped fiber glass | 0–10 parts |

The water is placed in a mortar mixer, the cement and fly ash are added and mixed in thoroughly. The vermiculite (or perlite) is then mixed in. The pregenerated foam is added and folded in by the mixing blades. Chopped fiber glass, up to about one-half inch in length of fiber, may be added to the mixer. As soon as the foam is folded into the mix, the cementitious slurry is pumped, or poured, into molds for the preparation of the panels. The amount of pregenerated foam required for the desired final low density of the panels (of about 20–40 pcf dry density) is determined by the wet weight of mixed cementitious slurry in a known volume.

After the cementitious panels have partially cured for about a day, the impervious skin is perforated to provide about 15% of the skin surface as opening to the interior system of interconnected cellular structures. Then, after further curing for about a week, any loose dust in the perforations is flushed out with a high pressure water spray. When larger blocks of low density material are cast, the material is sliced into predetermined thicknesses after about a day of partial curing. When fully cured, the sliced sections are separated and bonded between perforated surfacing materials to yield the desired acoustical panels.

For spraying of acoustical material on any plane or curved surface, such as concrete or steel, the premixed mortar, without foam or chopped glass fiber, is pumped to the site through a hose to a spray gun. A static in-line mixer is placed inside the spray gun before the nozzle. Pregenerated foam is introduced near the nozzle so that it is thoroughly mixed in the static in-line mixer with the premixed mortar in the fraction of a second before it is discharged, and without collapsing the foamed air bubbles in the mix. The amount of preformed foam thus introduced can be adjusted to give a controlled final dry density as low as 20 pcf and to any higher density up to the 85–90 pcf in the hopper in the absence of any foam. Chopped glass fiber, for example, of about three-quarter inch in fiber length, is best provided by a fiber glass chopper gun attached to the spray nozzle. The chopper gun is located so that the chopped fibers are wet out by the cementitious spray and incorporated into the acoustical structure for increased tensile strength, without affecting the sound absorbing properties of the material.

Fiber glass scrim may be placed in the mold to increase the strength of the low density structure.

EXAMPLE 1

To 76 pounds of water in a mortar mixer was added with mixing 94 pounds portland cement, 30 pounds pozzolonic fly ash, 12 pounds vermiculite, and one pound guar gum. The mixed mortar was dumped into a hopper provided with a Mogno pump at the bottom outlet. The cementitious slurry was pumped through a 50 foot long hose connected to a spray gun. The spray gun was provided with a static in-line mixer just before the nozzle. Preformed foam produced by a separate foam generator was conveyed pneumatically to the spray gun and introduced into the stream of cementitious slurry just before the static mixer, thus giving a thoroughly uniform light weight wet cementitious spray at the end of the nozzle. The volume of foam was adjusted to give a wet cementitious density of 33 pounds per cubic foot. 4 × 4 foot wooden molds were then filled by spraying the slurry into them, and the material was screed to a one inch height, so as to give upon curing one inch thick panels, 4 × 4 feet. The above operations of mixing and spraying were repeated until eight 4 × 4 molds were filled. After curing for a day, the impervious tough skins on the panels were perforated with $\frac{1}{8}$ inch spikes at $\frac{1}{2}$ inch centers to give about 15% open space on the surface of the panels. After further curing for seven days, a forceful stream of water was directed close to the surface of the panels, while they were in a vertical position. This served to flush out any dust in the openings, and thus gave access to the system of interconnected cells in the interior of the panels.

After air-drying to 25 pcf density, the eight panels were submitted to the Cedar Knolls Acoustical Laboratories for sound absorption tests according to the standard method of ASTM C-423-66. These tests gave the results mentioned above, namely:

Sound frequency (Hz)
  125, 250, 500, 1000, 2000, 4000
Coefficient (Sabin/ft$^2$)
  0.21, 0.20, 0.37, 0.76, 0.96, 0.68.

EXAMPLE 2

To 79 pounds of water in a mortar mixer was added with mixing 94 pounds portland cement, 20 pounds pozzolonic fly ash, 11 pounds vermiculite, and one pound guar gum. These components were mixed thoroughly. 23 pounds of preformed foam were then folded into the mix to give a wet density of 33 pounds per cubic foot. The low density slurry was poured into a four inch wide, 4 foot tall and 4 foot long wooden mold. After curing for a day, the end boards were removed and the block was sliced into two panels, each 2 inches thick. After curing for eight days, the boards were separated to give panels with interconnected cells, with a dry density of 26 pounds per cubic foot. Thin perforated aluminum sheeting was bonded to the cementitious panels to give durable lightweight panels with acoustical, sound absorbing properties.

Other variations of the procedures and materials disclosed in this application may be suggested by those skilled in the art. It is intended to encompass all such changes and modifications as fall within the scope and spirit of the appended claims.

We claim:

1. An acoustical sound-absorbing cementitious product composed of hydraulic cement, selected from the group comprising portland cement, calcium aluminate cement, and gypsum cement, of lightweight aggregate and of foamed air cells, with a range of dry densities of 20–40 pounds per cubic foot, having an interior interconnecting cellular structure and an impervious surface with perforations providing open space accounting for at least 10% of the surface area, giving the sound waves access to the interior open cell structure.

2. A sound-absorbing product according to claim 1 in which the impervious surface is the natural tough skin of the cementitious material.

3. A sound-absorbing product according to claim 1 in which thin perforated sheeting selected from the group of materials comprising aluminum, steel, wood veneer, fiber hardboard, and plastic, is laminated to the surface of the low density cementitious composition.

4. A process for the production of cementitious sound-absorbing products having interior interconnected cellular structures, comprising the steps of mixing 100 parts by weight of hydraulic cement, selected from the group of portland cement, calcium aluminate cement, and gypsum cement, with the following ranges of other components, in parts by weight, water 55–120, pozzolonic fly ash 0–50, vermiculite or perlite 5–30, chopped fiber glass 0–10, guar gum 0–1, and preformed foam 5–30 parts, casting the mixed composition into forms, partially curing the cementitious product, perforating the impervious skin to provide at least 10% open space on the surface area to give access to the interior interconnected cellular structure and fully curing the product to a dry density of 20–40 pounds per cubic foot.

5. A process according to claim 4 in which the cementitious composition without the foam is pumped to a spray gun provided with a static in-line mixer before the nozzle, the preformed foam is then conveyed pneumatically and introduced at the static in-line mixer there to be mixed with the cementitious slurry and sprayed under controlled density unto a substrate to form the interior cellular structure and the impervious skin, which is perforated for sound absorption characteristics.

6. A process according to claim 4 in which one or both impervious skin surfaces are skived off after partial curing to expose the interconnected cellular structure, the curing is completed and the panels are then formed into a sandwich construction by bonding thin perforated sheeting, selected from the group of materials comprising aluminum, steel, wood veneer, compressed fiber board, and plastics, to the low density skinless surfaces of the panels.

7. A process according to claim 4 in which the cast panels after partial curing are sliced into narrower panels of controlled width, the curing is then completed and the sliced panels are separated and bonded to perforated thin sheeting selected from the group of materials comprising aluminum, steel, wood veneer, compressed fiber board, and plastics.

8. A process according to claim 7 in which the sandwich construction with the thin sheeting is made with one side of the panel being bonded to perforated sheeting for absorption of sound waves while the other side of the panel is bonded to imperforated sheeting to reflect the sound waves.

* * * * *